US005129466A

United States Patent [19]

Bartels et al.

[11] Patent Number: 5,129,466

[45] Date of Patent: Jul. 14, 1992

[54] HYDRAULICALLY OPERATED STRIKING MECHANISM

[75] Inventors: Robert-Jan Bartels; Hans-Dieter Piotrowski, both of Essen, Fed. Rep. of Germany

[73] Assignee: Krupp Maschinentechnik Gesellschaft mit Beschrankter Haftung, Essen, Fed. Rep. of Germany

[21] Appl. No.: 756,802

[22] Filed: Sep. 9, 1991

[30] Foreign Application Priority Data

Sep. 8, 1990 [DE] Fed. Rep. of Germany ....... 4028595

[51] Int. Cl.[5] ........................... B25D 9/18; B23Q 5/00

[52] U.S. Cl. ....................................... 173/13; 173/138; 173/200; 173/206; 91/268; 91/272; 91/278; 91/300

[58] Field of Search ................... 173/11, 13, 105, 116, 173/119, 131, 134, 138, 139; 91/268, 272, 278, 320, 325, 281, 290

[56] References Cited

U.S. PATENT DOCUMENTS

| | | | |
|---|---|---|---|
| 4,187,917 | 2/1980 | Bouyoucos | 173/116 |
| 4,231,434 | 11/1980 | Justus | 173/134 |
| 4,314,612 | 2/1982 | Thomas et al. | 173/119 |
| 4,413,687 | 11/1983 | Eklöf | 173/134 |
| 4,429,751 | 2/1984 | Jackson et al. | 173/116 |
| 4,466,493 | 8/1984 | Wehlwend | 173/119 |

FOREIGN PATENT DOCUMENTS

| | | |
|---|---|---|
| 2654200 | 6/1977 | Fed. Rep. of Germany . |
| 2658455 | 6/1978 | Fed. Rep. of Germany . |

OTHER PUBLICATIONS

"Berg- und Hüttenmännische Monatshefte" [Mining and Foundry Monthly], pp. 475–476, vol. 124 (1979) No. 10.

*Primary Examiner*—Frank T. Yost
*Assistant Examiner*—Scott A. Smith
*Attorney, Agent, or Firm*—Spencer, Frank & Schneider

[57] ABSTRACT

A hydraulically operated striking mechanism includes a contact pressure control member held at least temporarily in contact with an insertion end of a drilling tool by a mechanism which applies a restoring force in the striking direction. A control conduit is connected by way of the contact pressure control member either to a pressure conduit or to a pressure return conduit. The control conduit actuates a switching element so that a control unit which alternatingly switches the movement of the striking piston performs a reversal movement into an operating stroke position at an earlier or later point in time during the return stroke of the striking piston and thus actuates the operating stroke of the striking piston in the striking direction.

11 Claims, 4 Drawing Sheets

HYDRAULICALLY OPERATED STRIKING MECHANISM

CROSS REFERENCE TO RELATED APPLICATIONS

The present application claims the rights of priority with respect to application Ser. No. P 40 28 595.2 filed Sep. 8, 1990 in Germany, the subject matter of which is incorporated herein by reference.

BACKGROUND OF THE INVENTION

The present invention relates to a hydraulically operated striking mechanism including a striking piston, a control unit which alternatingly switches the movement of the striking piston and a tool receiving mechanism for receiving the insertion end of a drilling tool that is charged by the striking piston and is held so as to be displaceable in the longitudinal direction, independently of the striking piston.

When drilling rock and anchor holes, a drilling tool (drill bit) requires high striking rates, in conjunction with a low energy for the individual blows and a low contact pressure force, primarily during the start-up phase in view of normally unfavorable conditions for placement of the tool (for example, sloping and/or fissured surfaces). After the drilling tool has been centered, it is necessary, in order to realize optimum drill advance, to switch the striking mechanism to a low number of blows while simultaneously increasing the energy of the individual blows and increasing contact pressure. A corresponding control process would desirably take place if softer layers (for example, clay) or cavities are to be drilled through.

It is already known, for example from German Patent No. 2,658,455, to adapt a pressure medium operated striking mechanism to changing operating conditions by influencing the striking frequency by way of an externally supplied control pressure. In this connection it is possible to influence the control pressure as a function of the operating pressure of the contact pressure unit generating the contact pressure as a function of the operating pressure of a possibly existing rotation mechanism or by way of a manually adjusted pressure supply.

SUMMARY OF THE INVENTION

It is an object of the present invention to provide a hydraulically operated striking mechanism so that, as a function of the contact pressure, the number of strokes can be adapted by means of an internal control in the striking mechanism itself, that is, on the shortest possible path, so as to minimize possible interferences occurring outside of the striking mechanism, delays caused by longer conductor paths during the transmission of pulses or signals, or due to operator error.

It is another object of the invention to provide a hydraulically operated striking mechanism that incorporates the above-mentioned drilling processes together with a rotation mechanism which can cause the tool insertion end to rotate.

The above and other objects are accomplished in accordance with the invention by the provision of a hydraulically operated striking mechanism, comprising: a striking piston housing having a longitudinal bore; a striking piston having control faces and displaceably disposed in the bore of the striking piston housing for alternating movement along a longitudinal axis of the striking piston in a striking direction and in an opposite return direction; tool receiving means connected to the striking piston housing for receiving an insertion end of a drilling tool to be charged by the striking piston and permitting displacement of the insertion end in the longitudinal direction of the striking piston, when charged by the striking piston, independently of displacement of the striking piston; an operating pressure conduit for supplying a driving medium to the striking piston with a hydraulic operating pressure; a return pressure conduit for providing the striking piston with a pressure free return for the driving medium; control means coupled to the operating pressure conduit, the return pressure conduit and the striking piston, and being movable between an operating stroke position and a return stroke position for alternatingly switching the direction of movement of the striking piston by controlling application of the driving medium to the control faces of the striking piston in the operating stroke and return stroke positions; a contact pressure control member displaceably mounted in the striking piston housing and being subject to a restoring force in the striking direction for at least temporarily contacting the insertion end of the drilling tool with a contact pressure; restoring means for supplying the restoring force to the contact pressure control member; a control conduit connectable to one of the operating pressure conduit and the return pressure conduit by way of the contact pressure control member depending on whether, respectively, the contact pressure control member contacts only the insertion end when the restoring force exceeds the contact pressure, or contacts the insertion end and a stop disposed opposite the pressure control member and remote from the insertion end with respect to the pressure control member when the contact pressure exceeds the restoring force; and switching means coupled to the control conduit and the control means for causing the control means to move into the operating stroke position and thus initiate the operating stroke of the striking piston in the striking direction at an earlier or later point in time in dependance on the pressure of the medium in the control conduit.

The invention is based on the fact that a contact pressure control member is held at least temporarily in contact with the tool insertion end under the influence of a restoring force that is active in the striking direction. The contact pressure control member influences the control unit that switches the movement of the striking piston as a function of the changing magnitude of the contact pressure acting on the insertion end and on the contact pressure control member so that the return stroke of the striking piston (in the direction opposite to the striking direction) is interrupted at an earlier or later point in time. The contract pressure control member acts on the control unit so that the change from the return stroke movement to the operating stroke movement takes place at a later point in time if the contact pressure transmitted from the insertion end to the contact pressure control member is greater than the restoring force acting in the striking direction. The rise of the contact pressure beyond the value of the restoring force thus causes the control unit to increase the stroke of the striking piston by way of the concomitant displacement of the contact pressure control member in the direction opposite to the striking direction. Connected with the increase in the length of the stroke of the striking piston is a drop in the number of strokes and an increase in the energy of each individual stroke.

The contact pressure control member is displaceable between two operating positions in dependence on the magnitude of the contact pressure relative to the magnitude of the restoring force. These two operating positions have a different effect on the switching member that influences the control unit and is actuated by way of the control conduit. The two operating positions are determined (at least temporarily) by the position of the insertion end and by the location of a stationary stop.

Preferably, the contact pressure control member is associated with the control conduit, the return conduit which is kept free of pressure and with the pressure conduit that is charged with the operating pressure during operation. The contact pressure control member is configured so that the control conduit is connected to the return conduit if the contact pressure control member lies against the stop which occurs when the contact pressure exceeds the restoring force.

On the other hand, when the contact pressure control member is held in contact only (temporarily) with the insertion end, which occurs when the restoring force exceeds the contact pressure, the control conduit is connected to the pressure conduit.

The restoring force acting on the contact pressure control member may be generated in any desired manner, for example by means of a mechanical spring element. In a preferred embodiment of the invention the restoring force is generated hydraulically by an annular face on the contact pressure control member oriented in the striking and in communication with the pressure conduit.

In one embodiment of the invention, the striking piston has an associated return channel within the striking mechanism housing. This return channel opens into the striking piston bore and communicates with the return conduit. Under the influence of the return channel, the control unit can be switched into its operating stroke position as a function of the position of the striking piston during its return stroke. By means of the switching element, at least one additional channel can be connected to the return channel.

If the contact pressure is greater than the restoring force, the at least one additional channel is blocked against the switching channel under the influence of the switching element with the result that the control unit switches into the operating stroke position only at the next possible moment and the striking piston correspondingly performs the greatest possible stroke.

The play for movement of the contact pressure control member is smaller than that of the insertion end in the direction of the striking piston axis. Generally, the play for movement of the contact pressure control member in the direction of the operating stroke of the striking piston is limited by a thrust bearing within which the tool insertion end is disposed for movement back and forth in the direction of its longitudinal extent.

The magnitude of the play for movement results from the operation of the contact pressure control member which must be able to alternatingly connect the control conduit for the switching element to the pressure conduit or to the return conduit.

According to one embodiment where there is only a single additional channel, the switching element may be configured as a spring charged blocking valve whose closing member is movable relative to the additional channel into an open or blocking position. The blocking valve is configured and switched so that its closing member takes on the blocking position when the contact pressure control element lies against the stationary stop under the influence of the contact pressure.

In another embodiment of the invention, the switching element is configured as a spring tensioned displacement piston by way of which at least one additional channel can be connected, if necessary, to the return conduit in addition to the return channel by way of the displacement piston and in dependence on the magnitude of the pressure charge in the control conduit. The advantage realized by the use of a displacement piston is that several additional channels can be connected in and out in succession as a function of the pressure acting on the displacement piston.

In order to avoid, if possible, undesirable pressure surges in the region of the contact pressure control member and of the switching element, the pressure conduit and the control conduit are provided with damping chokes which are preferably disposed in the vicinity of the location where the conduits open into the region of the contact pressure control member.

In an advantageous embodiment of the present invention, the contact pressure control member comprises a displacement sleeve which is provided with an annular face that is oriented in the striking direction and is charged by way of the pressure conduit and with an annular groove that is separated from the annular face and is disposed at the location where the control conduit opens and, depending on the position of the displacement sleeve with respect to the stop, lies either at the location where the pressure conduit opens or where the return conduit opens. By means of the restoring force acting on the annular face, the displacement sleeve is held in contact at least temporarily with the tool insertion end. Displacement of the displacement sleeve permits alternating establishment of a connection between the pressure conduit or the return conduit and the control conduit by way of the annular groove, thus actuating the switching element (the blocking valve or the displacement piston) in a suitable manner. Preferably, the displacement sleeve, which encloses the striking piston over part of its longitudinal extent, is longitudinally movable in the striking mechanism housing. The use of a displacement sleeve that is movable within a striking mechanism housing, is temporarily supported at the tool insertion end and encloses the striking piston over part of its longitudinal extent is disclosed in German Offenlegungsschrift [laid open patent application] No. 2,654,200. However, the displacement sleeve as disclosed in that document operates to automatically adjust its position and serves exclusively to dampen vibrations that occur within the tool.

The invention will now be described in greater detail with reference to several embodiments thereof that are illustrated in the drawing figures.

DETAILED DESCRIPTION OF PREFERRED EMBODIMENTS

Figure 1:
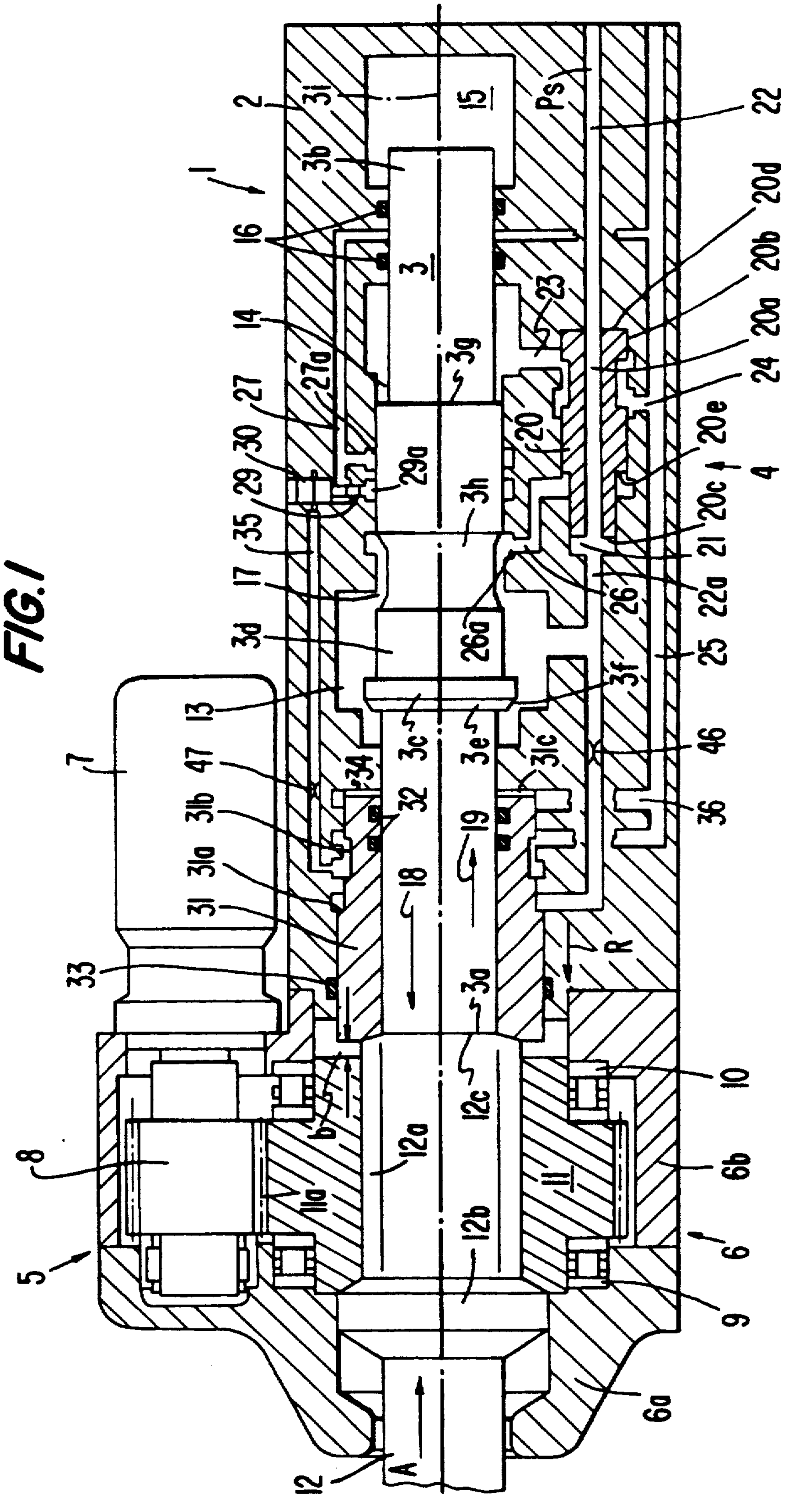
FIG. 1 is a schematic partial sectional view of a rotary percussion drill for the case that the contact pressure force acting on the tool insertion end is greater than an oppositely directed restoring force emanating from a displacement sleeve.

Referring to FIG. 1, there is shown a rotary percussion drill which comprises as its major components a striking mechanism 1 including a striking mechanism housing 2, a striking piston 3 that is able to move back and forth in the housing and a control unit 4. A rotation mechanism 5 having a rotation mechanism housing 6, composed of components 6a and 6b, is flanged by way of the latter component to striking mechanism housing 2. Component 6b is fastened to a hydraulic motor 7 which drives a drive pinion 8 that is supported in rotation mechanism housing 6 in both directions of rotation. Supported at two axial bearings 9 and 10, rotation mechanism housing 6 also accommodates a thrust bearing 11 in the form of a toothed wheel, with drive pinion 8 engaging in teeth 11a of thrust bearing 11.

An insertion end 12 for a drilling tool (not shown) has a spline profile 12a forming a torque connection with thrust bearing 11 so as to be movable in the axial direction. The amount of play of insertion end 12 relative to rotation mechanism housing 6 and thrust bearing 11 is limited by a step 12b. Insertion end 12, caused to rotate under the influence of hydraulic motor 7, drive pinion 8 and thrust bearing 11, transfers the energy generated by striking piston 3 for each individual stroke to the drill (not shown). Striking piston 3 has a tip 3a which cooperates with an impact surface 12c of insertion end 12 and both tip 3a and impact surface 12c are subjected to considerable stresses.

Striking mechanism housing 2 has three chambers separated from one another by the striking piston, namely (seen in their sequence starting at tip 3a of the striking piston) a pressure chamber 13, a reversal chamber 14 and a chamber 15 into which the rear end 3b of the striking piston projects to a greater or lesser degree. In the illustrated embodiment, chamber 15 is kept free of pressure; however, if necessary, it may also be filled with compressed gas.

Striking mechanism housing 2 has two sealing elements 16 in the region between chambers 14 and 15 in order to seal it against the environment.

The amount of play for movement of striking piston 3 with respect to striking mechanism housing 2 is limited by an annular projection 3c lying in pressure chamber 13. On the side facing the end 3b of striking piston 3, annular projection 3c changes into a narrower cylindrical section 3d. On the side facing tip 3a of the striking piston, annular projection 3c is provided with a frustoconical section 3e which permits the formation of a pressure cushion to brake the movement of striking piston 3. Cylindrical section 3d is designed with respect to its diameter so that it is able to block a bore section 17 against pressure chamber 13 which follows bore section 17 in the direction toward piston end 3a.

Striking piston 3 is charged with pressure, under the influence of the known control unit 4, in such a way that it alternatingly performs a working stroke in the striking direction (arrow 18) or a return stroke in the opposite direction (arrow 19).

Control unit 4 is essentially composed of a control slide 20 that is provided with a passage bore 20a and is held in a cylinder chamber 21 so as to be movable back and forth in the longitudinal direction. Slide 20 is in communication with a pressure conduit 22 by way of cylinder chamber 21 and with pressure chamber 13 by way of an extension 22a of pressure conduit 22 (following control unit 4). During operation, pressure conduit 22 is charged with an operating pressure $P_S$ required for striking mechanism 1 by way of a pressure oil source (not shown).

Reversal chamber 14 is connectable, by way of a reversal channel 23, cylinder chamber 21 and a connecting channel 24, to return conduit 25 or, by way of components 23 and 21, to pressure conduit 22, in dependence of the position of control slide 20 within cylinder chamber 21.

The charging with pressure of striking piston 3 is effected so that its smaller return stroke face 3f, which produces the return stroke movement during operation, is constantly charged with the operating pressure by way of pressure conduit 22, 22a. In contrast thereto, the larger working stroke face 3g which actuates the working stroke is charged with operating pressure only temporarily by way of reversal chamber 14 whenever control slide 20 is displaced (by performing a movement toward the left) into the other, operating stroke position (not shown). The movement of control slide 20 has the result that section 20b interrupts the connection between channels 23 and 24 and simultaneously reversal channel 23 is connected to pressure conduit 22.

With respect to the size of its two end faces 20c and 20d and its other annular faces, including annular face 20e, control slide 20 is dimensioned so that it takes on the return stroke position shown in FIG. 1 as long as pressure is charged through a switching channel 26 on annular face 20e adjacent to end face 20c (as shown in the drawing). Switching channel 26 which, according to FIG. 1, is in communication by way of an annular groove 26a and a bore section 17 with pressure chamber 13, additionally is connectable with a return channel 27 which is connected to return conduit 25 and, on its side facing striking piston 3, is provided with an annular groove 27a.

The region of striking piston 3 following cylinder section 3d toward rear end 3b is provided with a throughgoing annular groove 3h through which, during the return stroke, control unit 4 is switched to the operating stroke position. As soon as annular groove 3h connects annular grooves 26a and 27a with one another, as a function of the position of striking piston 3, and thus connects them to return conduit 25, there is a drop in pressure in switching channel 26 (whose connection with pressure chamber 13 under the influence of cylinder section 3d is interrupted), through which annular face 20e of control slide 20 had been charged with operating pressure. Under the influence of pressure at end face 20d, which is greater once annular face 20e has been relieved of pressure, control slide 20 is displaced to the left with the already mentioned consequence that charging reversal chamber 14 with operating pressure, causes the operating stroke of striking piston 3 to be actuated in the direction of arrow 18.

Figure 3:
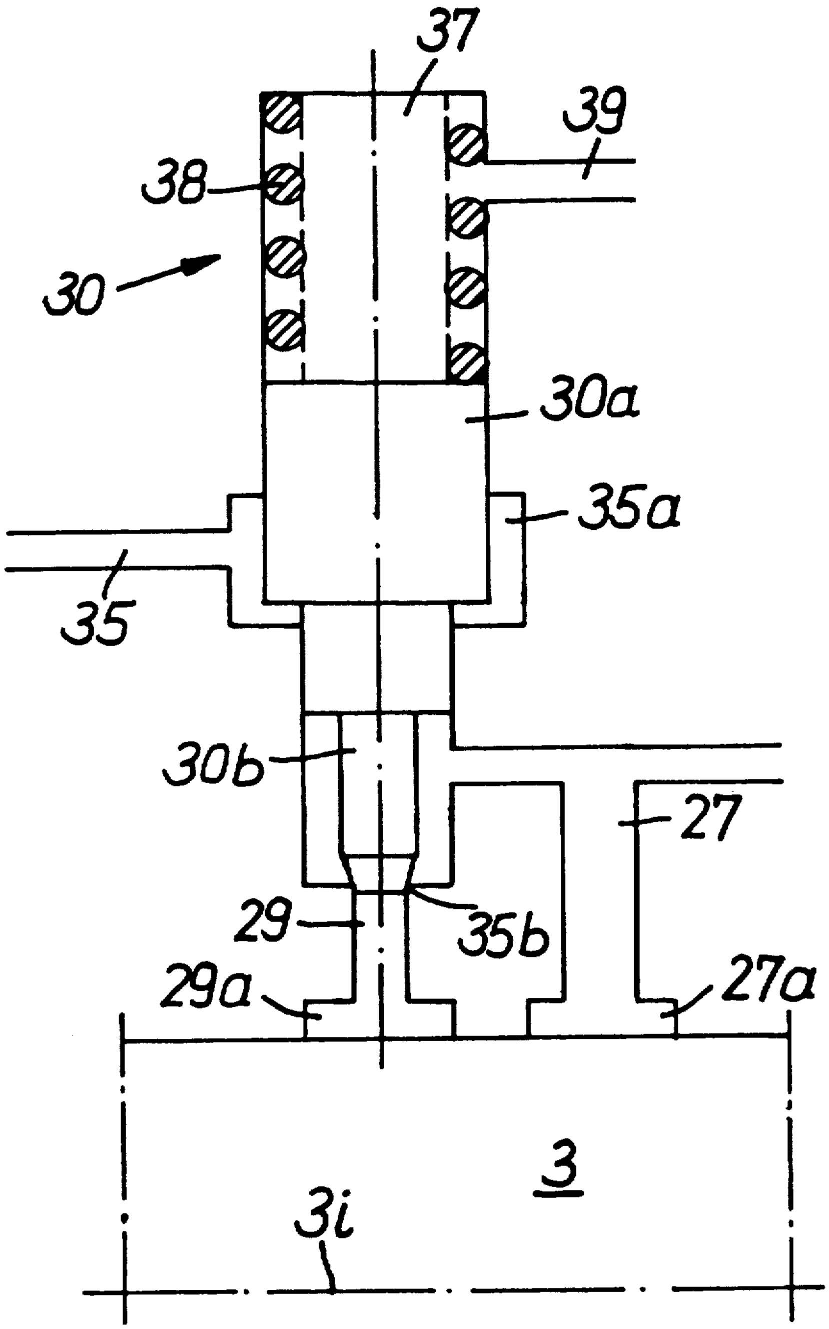
FIG. 3 is a partial sectional view enlarged with respect to FIG. 1 of the region of the switching element in the form of a blocking valve.

In order to be able to automatically adapt the mode of operation of the rotary percussion drill to changing operating conditions, an additional channel 29 is provided between return channel 27 and switching channel 26 whose annular groove 29a opens toward striking piston 3 (see in this connection also FIG. 3). Additional channel 29 is in communication with switching channel 26 through the intermediary of a switching element in the form of a spring biased blocking valve 30. The mode of operation of blocking valve 30 will be described in greater detail below.

Striking mechanism 1 is further equipped with a contact pressure control member in the form of a displacement sleeve 31 which is supported so as to be longitudinally movable at the striking piston 3 and temporarily in contact at contact face 12c of insertion end 12. To seal displacement sleeve 31 against striking piston 3 and striking mechanism housing 2, sealing elements 32 and 33, respectively, are provided which are held in displacement sleeve 31 and in the striking mechanism housing, respectively. The play for movement of displacement sleeve 31 is determined by the distance between thrust bearing 11 and a stationary impact face 34 in striking mechanism housing 2 and is marked b (in the longitudinal direction of displacement sleeve 31).

Displacement sleeve 31 has an annular face 31a oriented in the striking direction (arrow 18) and an annular groove 31b separated therefrom. The latter is configured and arranged so that it alternatingly connects a control conduit 35, connected to blocking valve 30, either with extension 22a of pressure conduit 22 or with return conduit 25, as a function of the position of displacement sleeve 31.

In the operating state, annular face 31a is charged constantly with operating pressure by way of extension 22a. In this way, a holding force is generated which is active in the direction of the operating stroke (arrow 18) and under whose influence displacement sleeve 31 is held in contact with insertion end 12 or the thrust bearing 11 (depending on the respective position of insertion end 12). If thus contact force A transmitted by insertion end 12 is greater than restoring force R which is directed opposite thereto and is generated by means of the operating pressure, displacement sleeve 31 is pushed, under the influence of insertion end 12, against impact face 34 with the result that control conduit 35 is kept without pressure by way of annular groove 31b and return conduit 25. If the magnitude of restoring force R exceeds that of contact pressure A (FIG. 2), displacement sleeve 31, on the average, lies against thrust bearing 11. Consequently control conduit 35 is charged with operating pressure $P_S$ by way of annular groove 31b and extension 22a; at the same time the connection between annular groove 31b and return conduit 25 is interrupted.

In order to prevent an undesirable pressure cushion from building up between displacement sleeve 31 and impact face 34, at least one relief groove 31c is provided on the side of displacement sleeve 31 facing impact face 34. Moreover, the environment of impact face 34 is pressure relieved by way of a return channel 36 which opens into return conduit 25.

The play for movement b of displacement sleeve 31 parallel to the longitudinal direction of striking piston 3 and of insertion end 12 is dimensioned considerably smaller than the play for movement of the insertion end within rotation mechanism housing 6.

Blocking valve 30 (see in this connection FIG. 3 in particular) includes a displacement piston 30a which is supported within a cylindrical bore 37 on one side at a restoring spring 38 having a predetermined bias. On its side, facing striking piston 3, displacement piston 30a changes into a pin-like closing member 30b which in the rest position (shown in FIG. 3) is supported under the influence of restoring spring 38 at an abutment face 35b. Cylindrical bore 37 is relieved of pressure through a leakage channel 39 which my be in communication, for example, with return conduit 25 shown in FIG. 1.

As long as the pressure coming from control conduit 35 and charged on displacement piston 30a by way of an annular groove 35a is less than the predetermined bias force emanating from restoring spring 38, closing member 30b engages in additional channel 29 and blocks it against return channel 27. Under these conditions, additional channel 29 is ineffective with respect to an influence on control unit 4. The mentioned rest position of blocking valve 30 corresponds to the operating state shown in FIG. 1 in which displacement sleeve 31 lies, on the average, against abutment face 34 and connects control conduit 35 with return conduit 25.

If contact pressure A takes on smaller values than the restoring force acting on displacement sleeve 31 (FIG. 2), control conduit 35 is charged with the operating pressure through extension 22a of the pressure conduit, displacement piston 30a and closing member 30b are displaced against the force of restoring spring 38 and thus a connection is established between channels 29 and 27. If now annular groove 3h (FIG. 1), in the course of the return stroke movement of the striking piston, reaches the region of annular groove 29a of additional channel 29, a connection between switching channel 26, additional channel 29 and the pressure-free return channel 27 is established at the earlier point in time resulting therefrom. Since control unit 4 is correspondingly switched into the operating stroke position at an earlier time, striking piston 3 performs a smaller stroke at an increased striking rate and with reduced energy for each individual blow. Under the influence of displacement sleeve 31 and blocking valve 30, the rotary percussion drill according to the invention automatically adapts itself to the change in contact pressure created by the operating conditions and this is accomplished independently of any monitoring and manipulation by an operator.

Figure 2:
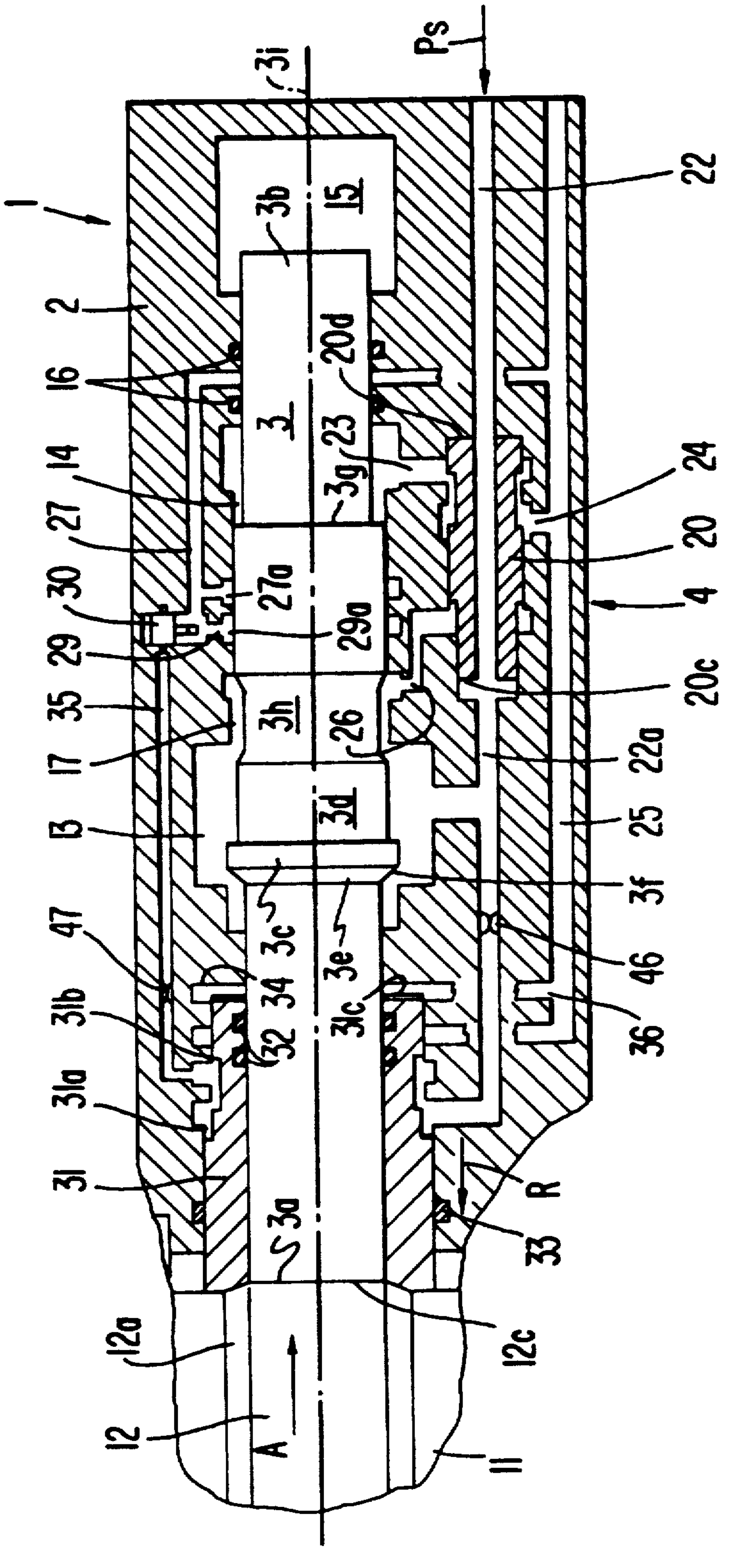
FIG. 2 is a partial sectional view similar to FIG. 1 for the case that the restoring force emanating from the displacement sleeve is greater than the contact pressure force acting on the tool insertion end.

In the embodiment of FIGS. 1 to 3, the region of striking mechanism housing 2 between sealing elements 16 is pressure relieved by means of return channel 27 which opens into return conduit 25.

Figure 4:
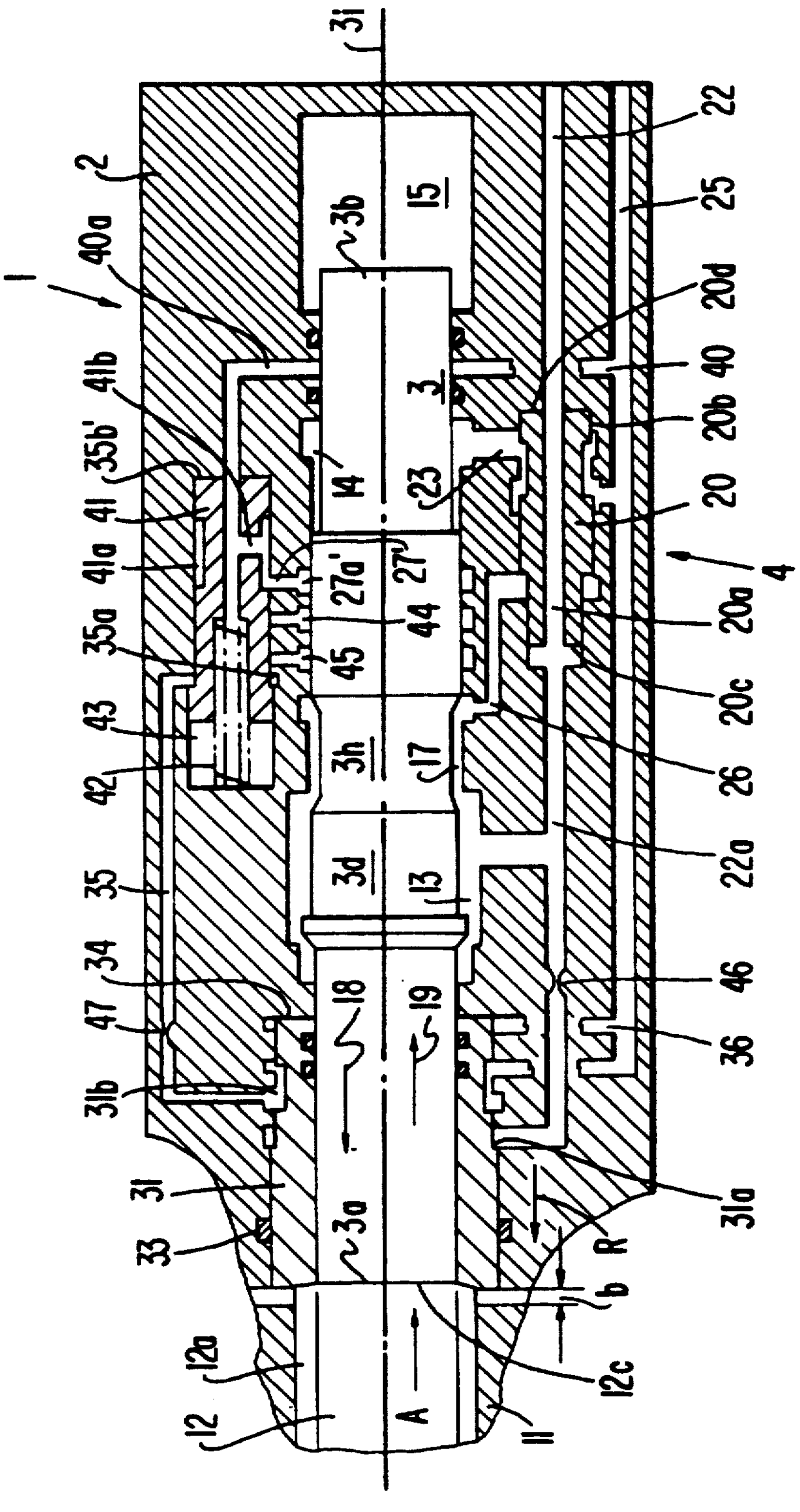
FIG. 4 is a partial sectional view of a rotary percussion drill including a switching element in the form of a displacement piston.

In the embodiment according to FIG. 4, the switching element for influencing control unit 4 is configured as a displacement piston 41 which is displaceable against the force of a restoring spring 42 within a cylindrical chamber 43. The rest position of displacement piston 41 is determined by an abutment face 35b'.

By way of an annular recess 41a and a bore 41b as well as an extension 40a of a leakage channel 40, a return channel 27' is connected to return conduit 25. In the direction toward tip 3a of the striking piston, two additional channels 44, 45 are associated with the return channel. In dependence on the pressure charged on displacement piston 41 and its resulting operating position, these additional channels may lie opposite annular recess 41a and thus may become effective with respect to influencing control unit 4.

In the illustrated operating state, displacement sleeve 31 lies against abutment 34 so that control conduit 35 is pressure relieved through annular groove 31b and return conduit 25. If displacement sleeve 31 is displaced to the left against the force of contact pressure A, displacement piston 41 performs a correspondingly directed movement against the force of restoring spring 42, in the course of which, depending on the pressure charged through control conduit 35, either only additional channel 44 or also additional channel 45 are covered by annular recess 41a. Control unit 4 is accordingly switched into the operating stroke position if annular groove 3*h* connects additional channel 45 or additional channel 44 with switching channel 26.

The embodiment in FIG. 4 thus makes it possible to adapt the mode of operation of the rotary percussion drill in more than two stages to the changing magnitude of the contact pressure A transmitted by insertion end 12.

Advantageously, conduits 22*a* and 35 are equipped with damping chokes 46, 47 in the vicinity of their openings in the region of displacement sleeve 31.

The advantage realized with the present invention resides, in particular, in that the striking rate and the energy of each individual blow are automatically adjusted as a function of the magnitude of the contact pressure acting on a measuring member (displacement sleeve). The associated components are here part of the rotary percussion drill itself, eliminating the need for special supply and control conduits. It is thus not necessary for an operator to monitor the operation of the rotary percussion drill.

The present invention can of course also be employed for devices which include only a hydraulically operated striking mechanism and whose tool insertion end is accordingly held so as to only be movable back and forth in the longitudinal direction of the striking mechanism housing.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A hydraulically operated striking mechanism, comprising:

a striking piston housing having a longitudinal bore;

a striking piston having control faces and displaceably disposed in the bore of said striking piston housing for alternating movement along a longitudinal axis of said striking piston in a striking direction and in an opposite, return direction;

tool receiving means connected to said striking piston housing for receiving an insertion end of a drilling tool to be charged by said striking piston and permitting displacement of the insertion end in the longitudinal direction of said striking piston, when charged by said striking piston, independently of displacement of said striking piston;

an operating pressure conduit for supplying a driving medium to said striking piston with a hydraulic operating pressure;

a return pressure conduit for providing said striking piston with a pressure free return for the driving medium;

control means coupled to said operating pressure conduit, said return pressure conduit and said striking piston, and being movable between an operating stroke position and a return stroke position for alternatingly switching the direction of movement of said striking piston by controlling application of the driving medium to the control faces of said striking piston in said operating stroke and return stroke positions;

a contact pressure control member displaceably mounted in said striking piston housing and being subject to a restoring force in the striking direction for at least temporarily contacting the insertion end of the drilling tool with a contact pressure;

restoring means for supplying the restoring force to said contact pressure control member;

a control conduit connectable to one of said operating pressure conduit and said return pressure conduit by way of said contact pressure control member depending on whether, respectively, said contact pressure control member contacts only the insertion end when the restoring force exceeds the contact pressure, or contacts the insertion end and a stop disposed opposite said pressure control member and remote from the insertion end with respect to said pressure control member when the contact pressure exceeds the restoring force; and switching means coupled to said control conduit and said control means for causing said control means to move into the operating stroke position and thus initiate the operating stroke of the striking piston in the striking direction at an earlier or later point in time in dependance on the pressure of the medium in said control conduit.

2. An apparatus as defined in claim 1, wherein said control conduit is connected to said pressure return conduit when said contact pressure control member lies against said stop.

3. An apparatus as defined in claim 1, wherein said contact pressure control member has a holding surface which is oriented in the striking direction and is in communication with said pressure conduit.

4. An apparatus as defined in claim 1, further including a return channel opening into the bore of said striking piston and coupled with said pressure return conduit, and at least one additional channel connectable with said return channel by said switching means, said control means being switched into the operating stroke position under the influence of said return channel and in dependance on the position of the striking piston during the return stroke.

5. An apparatus as defined in claim 4, wherein there is only one additional channel, and said switching means comprises a spring biased blocking valve having a choke member movable into one of an open and blocking position relative to said additional channel.

6. An apparatus as defined in claim 4, wherein said switching means comprises a spring biased displacement piston responsive to pressure in said control conduit for being displaced so that said at least one additional channel can be connected to said return conduit by way of said return channel.

7. An apparatus as defined in claim 1, wherein said contact pressure control member has a play for movement in the direction of the longitudinal axis of said striking piston that has a smaller dimension than a play for movement of the insertion end permitted by said tool receiving means.

8. An apparatus as defined in claim 7, wherein said tool receiving means comprises a thrust bearing with respect to which the insertion end of a tool can be moved back and forth in the direction of its longitudinal extent, and the play for movement of said contact pressure control member in the direction of the operating stroke of said striking piston is limited by said thrust bearing.

9. An apparatus as defined claim 1, wherein said operating pressure conduit and said control conduit each include a damping choke.

10. An apparatus as defined in claim 1, wherein said contact pressure control member comprises a displacement sleeve having an annular face oriented in the striking direction and charged by way of the pressure conduit and an annular groove separated from said annular face and disposed at an opening of said control conduit at said displacement sleeve and, depending on the position of said displacement sleeve relative to said stop, at one of an opening of said operating pressure conduit and an opening of said pressure return conduit.

11. An apparatus as defined in claim 10, wherein said displacement sleeve encloses said striking piston over part of the longitudinal extent of said striking piston and is guided so as to be longitudinally movable in said striking piston housing.

* * * * *